(12) United States Patent
Burleson et al.

(10) Patent No.: US 6,522,763 B2
(45) Date of Patent: *Feb. 18, 2003

(54) IMPACT-RESISTANT ELECTRONIC DEVICE

(75) Inventors: Winslow Scott Burleson, Palo Alto, CA (US); Edwin Joseph Selker, Palo Alto, CA (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/133,985

(22) Filed: Aug. 13, 1998

(65) Prior Publication Data

US 2002/0057813 A1 May 16, 2002

(51) Int. Cl.⁷ ............................................. H04R 25/00
(52) U.S. Cl. ..................... 381/189; 381/306; 381/333; 381/388; 361/682; 361/683
(58) Field of Search .................................. 381/306, 333, 381/388, 189, 353–354; 361/681–683

(56) References Cited

U.S. PATENT DOCUMENTS

| | | | |
|---|---|---|---|
| 5,426,564 A | 6/1995 | Hsu | 361/707 |
| 5,430,607 A | 7/1995 | Smith | 361/683 |
| 5,430,617 A | 7/1995 | Hsu | 361/818 |
| 5,583,742 A | 12/1996 | Noda et al. | 361/683 |
| 5,623,390 A | 4/1997 | Noda et al. | 361/679 |
| 5,638,456 A | 6/1997 | Conley et al. | 381/190 |
| 5,646,820 A | 7/1997 | Honda et al. | 361/683 |
| 5,682,290 A | 10/1997 | Markow et al. | 361/683 |
| 5,706,168 A | 1/1998 | Erler et al. | 361/685 |

*Primary Examiner*—Curtis Kuntz
*Assistant Examiner*—Dionne N. Harvey
(74) *Attorney, Agent, or Firm*—Jose Gutman; Fleit, Kain, Gibbons, Gutman & Bongini P.L.

(57) ABSTRACT

A portable electronic device includes a sound system having one or more speakers, each located at an impact point of the electronic device. Each speaker includes a sound chamber and shock absorbing means for protecting the electronic device from a force resulting from an impact between the electronic device and another object.

5 Claims, 2 Drawing Sheets

IMPACT-RESISTANT ELECTRONIC DEVICE

CROSS-REFERENCE TO RELATED APPLICATIONS

Not applicable.

BACKGROUND OF THE INVENTION

1. Field of the Invention

The invention disclosed broadly relates to portable electronic devices, and more particularly relates to portable computer systems with speaker systems.

2. Description of the Related Art

Two additional U.S. patent applications dealing with related technology have been filed on even date herewith. Both applications have common inventors and a common assignee with the present application. The first application Ser. No. 09/132,804 is entitled "Expandable Speaker Chambers" (referred to hereinafter as the "Expandable Speaker Chambers Patent"). The second application Ser. No. 09/133,518 is entitled "Apparatus Using Cooling Spaces as Speaker Chambers" (referred to hereinafter as the "Using Cooling Spaces as Speaker Chambers Patent").

Portable electronic devices abound in today's markets. Such devices include portable games, laptop computers, personal organizers, Global Positioning System ("GPS") receivers, and myriad other devices. These devices have become portable, and others will follow this trend, in large part because of the advances in technology that have allowed the devices to shrink in size and weight. Circuitry, hard disk storage, screens, speakers, and many other components have all been reduced in size. Improving technology also enables these components to operate on less power, which allows the power supplies and cooling mechanisms to be reduced in size and weight.

One disadvantage of shrinking the components has been a reduction in the quality of the audio. For many devices, this is not important because their communication with the user is primarily visual. However, many devices and applications do rely on audio for communication with, or entertainment of, the user. Additionally, many other portable devices and applications would be forthcoming if better audio were available. A common application which could utilize better audio is a workstation for accessing the World Wide Web ("WWW"), and the variety of multi-media content which it provides, including music and sound effects. Other examples include many of today's multi-media games for which sound quality is of paramount importance.

The poor sound quality is due to two primary factors. The first is the decreased speaker size. This factor makes it difficult to produce quality sound over a large frequency range, particularly at lower frequencies. The decreased speaker size also makes it difficult to produce loud sounds. The second is the decreased size of the speaker box, or speaker chamber. This also makes it difficult to produce quality sounds, particularly at low frequencies.

Several solutions have been proposed and developed. One solution involves interfacing to nonportable audio equipment and speakers. This is common in many conference rooms or classrooms which are designed for presentations and which have high quality audio systems already installed. The user is able to connect a portable computer and run a presentation with a laptop that uses the external audio system. This is also common for games and other entertainment systems that use a television set for the audio.

These are only partial solutions, however, because the user is limited in the number of places where he can use the device. In the context of a laptop being used to give a presentation, the user is limited to giving presentations in facilities which have high quality audio systems. The user is also faced with the many problems associated with interfacing to these systems and having compatible software and hardware, including connectors.

Another solution that allows the portable computer user to have high quality audio is for the user to bring along portable audio equipment. U.S. Pat. Nos. 5,082,084 and 5,550,921 show two such portable audio systems. Portable audio systems, however, are typically bulky and heavy. Additionally, they are not integrated into the portable computer or other device, and therefore make transportation and setup more difficult.

Another solution is to integrate better audio systems into the existing portable computers or other devices. U.S. Pat. Nos. 5,610,992 and 5,668,882 utilize the existing space in the portable electronic devices to produce higher quality sound. There are limits, however, to what can be done with the existing space. Further, the existing space is shrinking with each new advance that allows smaller components. Advances in low-power circuitry, in particular, limit the existing space. Not only does it allow smaller devices because the circuitry is smaller and because the power supplies and fans can be smaller, but it also allows a reduction in the amount of space around the circuitry that is needed for heat transfer.

Another solution, which is beginning to be seen in the portable telephone industry, is to create a larger space for the speaker with doors or flip stands that open part of the phone's enclosure. U.S. Pat. No. 5,537,472 shows this solution. However, this solution has not been developed sufficiently and even the initial ideas have not been applied to laptop computers and other electronic devices.

Safety and durability, in addition to size and weight, must also be addressed by any solution to the poor audio problem. Non-integrated systems pose additional risk of damage to the audio system and often to the portable electronic device itself.

As stated above, the miniaturization of electronic components has made possible a wide range of portable electronic devices. Among the most common of these are the personal laptop, notebook, or palmtop computers. Other electronic devices are also highly portable. Along with the obvious benefits of portability there are hazards due to the likelihood of dropping these devices or otherwise making impact with other objects. These portable devices are often expensive. Therefore, it is desirable to avoid damage resulting from use thereof.

The problem of damage to portable electronic devices is well known and perhaps the most common solution is to use shock absorbing padded carrying cases. However such cases are expensive and bulky and do not provide any protection while the computer is in use outside the container. U.S. Pat. No. 5,706,168, issued to Erler et al. discloses an impact attenuating notebook computer having a hard drive mounted on a shock-isolating mounting. According to that approach the cover of the computer is made from a shock-absorbing resilient material and the hard disk drive is mounted on a shock isolating mounting bridge configured to support the hard drive. Internal cavities enhance the absorption of the structure. This approach has the obvious drawback of increasing the cost of the computer by adding components for the sole purpose of shock absorbance.

U.S. Pat. No. 5,682,290 issued to Markow et al. discloses a portable computer having a speaker system including two loudspeakers in the keyboard section of the housing. However, the positioning of the speakers provides no protection against shock or impact to the computer unit.

Accordingly, there is a need for an improved portable electronic device that overcomes the problems in the prior art.

SUMMARY OF THE INVENTION

Briefly, in accordance with one embodiment of the invention, a portable electronic device comprises a sound system comprising one or more speakers, each located at an impact point of the electronic device. Each speaker comprises a sound chamber and shock absorbing means for protecting the electronic device from a force resulting from an impact between the electronic device and another object.

DETAILED DESCRIPTION OF AN EMBODIMENT

The embodiments disclosed solve the problems of the prior art by using the available space of a laptop for multiple purposes. Specifically, space is utilized both for a speaker chamber and for a safety feature.

The primary safety feature provided arises from the fact that a speaker chamber is constructed such that it can be used to absorb the impact of drops or collisions. Several embodiments are disclosed which can perform this function. Moreover, this safety chamber, or speaker chamber, is preferably located at a position on the laptop that is subject to frequent impacts.

The safety chamber is also used as, and designed for use as, a speaker chamber. This enables the provision of high quality audio. It also allows the sound system to remain an integrated feature of the laptop, and thus eliminates any need to attach external speakers or other external audio components. The fact of remaining an integrated system is itself an additional safety feature because the transport and storage is made simpler by having a single device which is relatively low in weight.

In such a system, the user can achieve two purposes with a single space. For the user who needs to obtain an added measure of safety in a laptop, the embodiments will provide that safety and at the same time provide a space for a speaker chamber. In this way, the user may also obtain better sound quality, because space for a larger speaker chamber may not have been otherwise available. Alternately, for a user who needs to obtain good sound quality in a laptop, the embodiments will provide that quality with the sound chamber and at the same time provide greater safety for the laptop as well.

Figure 1:
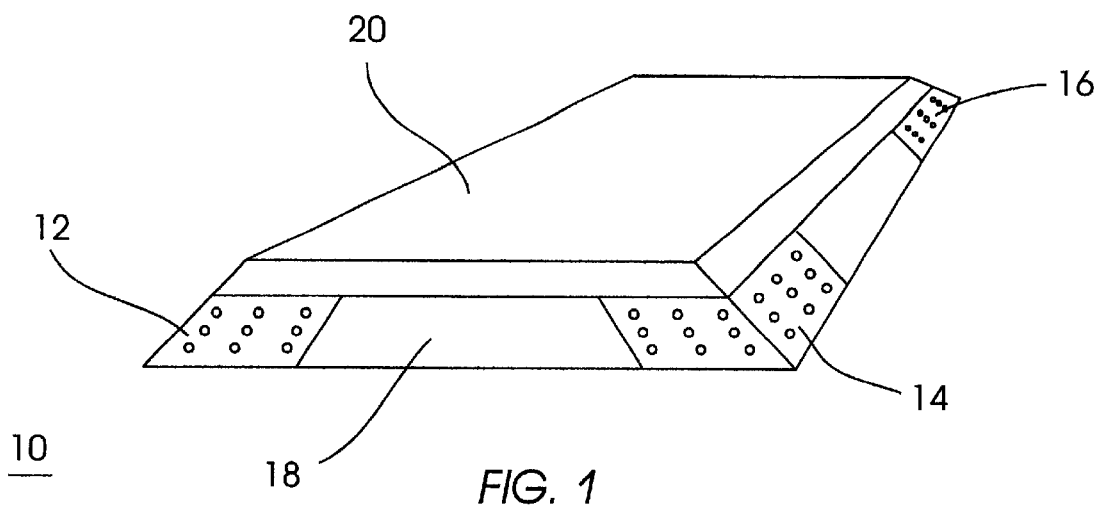
FIG. 1 is an oblique view of a portable computer having speakers located thereon according to the present invention.
Figure 2:
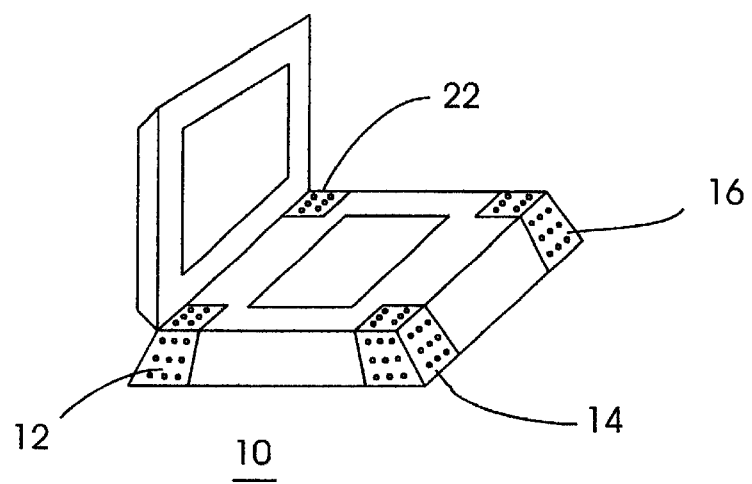
FIG. 2 shows the portable computer of FIG. 1 in an open position.

FIG. 1 shows a portable electronic device such as a laptop or palmtop computer unit 10 having speakers located thereon according to an embodiment of the present invention. The portable computer 10 includes speaker units 12, 14, 16 and 22 (shown in FIG. 2) at each corner thereof. The computer 10 comprises a CPU (central processor unit) system unit 18 and a cover/screen 20 that unfolds from a closed position to an open position wherein the screen is visible to the user. FIG. 1 illustrates the closed position. FIG. 2 shows the portable computer of FIG. 1 in the open position.

Figure 3:
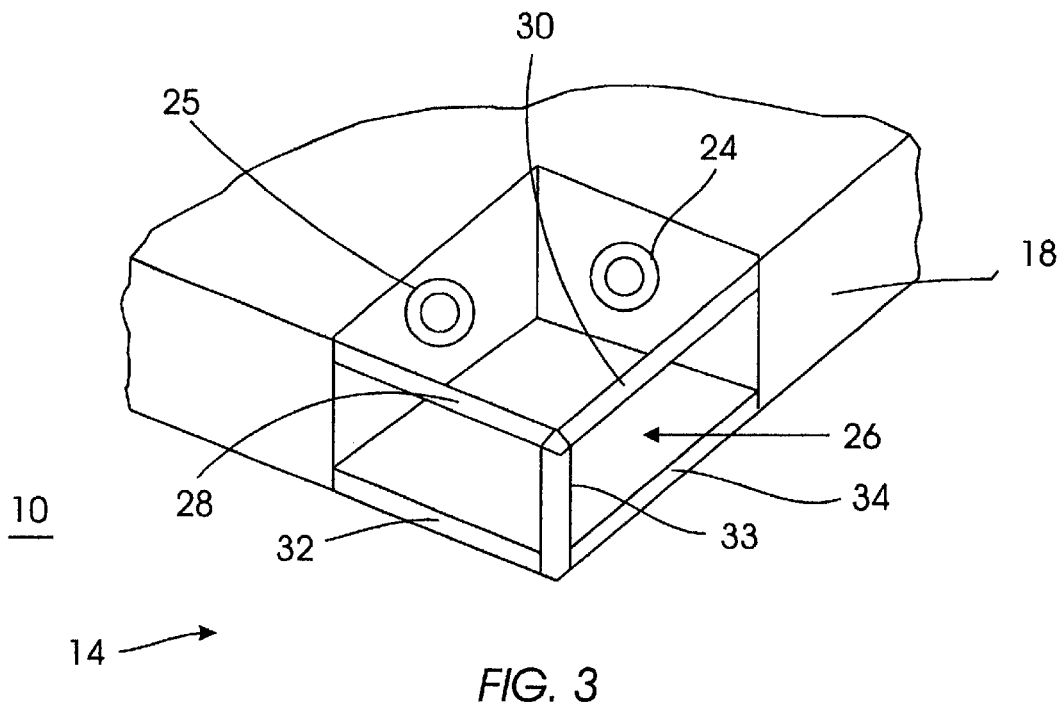
FIG. 3 shows speaker located on an impact zone of the portable computer.

FIG. 3 shows the speaker unit 14 located on an impact zone of the portable computer. For purposes of describing this embodiment, an impact zone is a corner or other part of the computer 10 that is subject to damage from impact forces resulting from a collision or other force exerted on the computer 10. An example of such a force is that resulting from the unit 10 being dropped on a hard surface. The speaker unit 14 has individual speakers 25 and 24 located in an acoustic cavity or chamber 26. The corner of unit 10 is formed by elements 28, 30, 32, 33, and 34. These elements are preferably made from metal strips strong enough to absorb an impact to prevent damage to the computer unit 10. Thus, the speaker cavities or the frames therein offer a cushioning effect that protects the components of the unit 10 from impact damage. The frames defining part of the chamber 26 provide an internal reinforcement of the housing of the device 10. The impact resistant frame protects the speakers 24 and 25 but more importantly they protect the unit 10 itself and the more expensive and fragile components inside the unit 10 from impact damage. Moreover, even if the speakers 24 and 25 are damaged from a fall or other impact the system 10 includes other speaker units at the other corners that would be likely to survive the impact due to the unlikelihood that the unit would be subject to impact forces that would damage all four speaker units 12, 14, 16 and 18. Even in the unlikely case that all four speaker units 12, 14, 16 and 18 were to be damaged it is likely that the shock absorption provided by the location of these speakers would protect the more expensive components inside the computer unit 10 and obviously the computer unit will still serve many useful functions without sound production therefrom.

Figure 4:
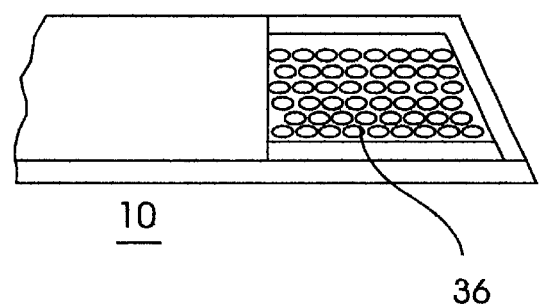
FIG. 4 shows a partial side view of a portable computer in accordance with the invention.

FIG. 4 shows a partial side view of the portable computer 10 in accordance with another embodiment of the invention. In this embodiment the chamber 26 contains an impact absorbing material 36 such as Styrofoam that also allows the passage of sound from the speaker to be heard outside the unit 10 yet protects the components of the portable unit 10. By using the speaker system both as a speaker system and a shock absorption mechanism two important functions are performed at little or no additional expense. Use of the sound system to provide sound and to reduce or eliminate damage from impact also has the advantage that the protection is an integral and at least partly interior part of the electronic device and hence reduces or eliminates the need for external (i.e., external to the device 10) protection such as expensive and bulky carrying cases. Even though the sound system shown herein is located at the corners of the device 10 there are many other impact points in the device 10 where the sound system could be advantageously located. For example, a single speaker could be provided under the entire outside surface of the top 20 of the device 10, or under any other outer surface, for that matter.

In accordance with another aspect of the invention, the electronic unit comprises a trapezoidal shape which is particularly suited to avoid more direct impact to areas other than those most vulnerable to impact. Thus if the device 10 is dropped the most likely places to make impact with the floor are the corners which protrude outwards to expose only the expendable sound system.

Although a specific embodiment of the invention has been disclosed, it will be understood by those having skill in the art that changes can be made to this specific embodiment without departing from the spirit and scope of the invention. The scope of the invention is not to be restricted, therefore, to the specific embodiment, and it is intended that the appended claims cover any and all such applications, modifications, and embodiments within the scope of the present invention.

What is claimed is:

1. A portable electronic device comprising a sound system, the sound system comprising at least one speaker, the at least one speaker comprising a sound chamber and a shock absorbing frame that defines both a corner of an outer housing of the portable electronic device and defines at least part of the sound chamber, the shock absorbing frame for protecting the portable electronic device from an external impact at the corner of the outer housing of the portable electronic device, wherein the sound chamber is at least partially formed by a plurality of inner walls of an outer corner of the outer housing, and wherein the shock absorbing frame and the sound chamber are for offering a cushioning effect for substantially absorbing said impact.

2. An audio system for use with an electronic device, the audio system comprising:

an outer housing of an electronic device;

a sound chamber, the sound chamber comprising a housing which defines the sound chamber, wherein the sound chamber is at least partially formed by a plurality of inner walls of a corner of the outer housing of the electronic device for substantially receiving an impact at the corner of the outer housing thereby providing protection against the impact to the electronic device; and means for protecting the sound chamber and therefore also the electronic device from harm resulting from an impact at the corner of the outer housing of the electronic device, wherein the means for protecting is internal to the outer housing of the electronic device foam and wherein the sound chamber and the means for protecting are for offering a cushioning effect that substantially absorbs said impact.

3. A portable computer comprising a sound system, the sound system comprising a speaker, a speaker chamber, and a shock absorbing frame defining at least part of the speaker chamber and additionally defining a corner of an outer housing of the portable computer for protecting the portable computer from an impact to the portable computer at the corner of the outer housing of the portable computer, and wherein the speaker chamber is at least partially formed by a plurality of inner walls of a corner of the outer housing, and wherein the speaker chamber and the shock absorbing frame are for offering a cushioning effect that substantially absorbs said impact.

4. A portable computer comprising:

an outer housing of the portable computer for containing components of a portable computer; and a sound system comprising:

at least one speaker; and at least one speaker chamber, at least partially formed by a plurality of inner walls of a corner of the outer housing of the portable computer and associated with the at least one speaker for providing audio, and wherein at least a portion of the at least one speaker chamber being, at least partially formed by a plurality of inner walls of a corner of the outer housing of the portable computer for protecting the components contained in the outer housing from an external impact to the corner of the outer housing, and wherein the at least one speaker chamber comprising a shock absorbing frame, the at least one speaker chamber and the shock absorbing frame are for offering a cushioning effect for substantially absorbing said external impact for protecting the components contained in the outer housing from said external impact to the outer housing.

5. The potable computer of claim 4, wherein the shock absorbing frame comprises metal strips strong enough to substantially absorb said external impact to the outer housing.

* * * * *